United States Patent [19]

Bruni

[11] Patent Number: 5,064,206
[45] Date of Patent: Nov. 12, 1991

[54] PISTON RING

[75] Inventor: Ludovico Bruni, Turin, Italy

[73] Assignee: Borgo-Nova SpA, Turin, Italy

[21] Appl. No.: 517,032

[22] Filed: May 1, 1990

[30] Foreign Application Priority Data

May 8, 1989 [IT] Italy .................. 67334 A/89

[51] Int. Cl.$^5$ .............................................. F16J 9/06
[52] U.S. Cl. ..................... 277/140; 277/138; 277/200
[58] Field of Search ............ 277/140, 138, 200, 216, 277/217, 223, 139, 141

[56] References Cited

U.S. PATENT DOCUMENTS

| | | | |
|---|---|---|---|
| 2,290,321 | 7/1942 | Engelhardt | 277/200 |
| 2,317,580 | 4/1943 | Bauer | 277/141 |
| 2,568,655 | 9/1951 | Olson | 277/200 |
| 2,676,076 | 4/1954 | Hamm | |
| 3,378,268 | 4/1968 | Anderson | 277/140 |
| 3,622,166 | 11/1971 | Brenneke | 277/138 |
| 3,650,537 | 3/1972 | Sugahara | 277/216 |
| 4,572,520 | 2/1986 | Shinada | 277/140 |

FOREIGN PATENT DOCUMENTS

| | | |
|---|---|---|
| 0318009 | 8/1929 | United Kingdom . |
| 1123332 | 1/1966 | United Kingdom . |
| 1068366 | 5/1967 | United Kingdom . |
| 1202601 | 8/1970 | United Kingdom . |

Primary Examiner—Allan N. Shoap
Assistant Examiner—Daniel G. DePumpo
Attorney, Agent, or Firm—William R. Hinds

[57] ABSTRACT

An oil control piston ring is described comprising a pair of axially spaced apart side rails, the side rails each having a radially outer periphery forming a rubbing face with a co-operating cylinder wall, an expander having portions which lie between the inner radially extending faces of the side rails and maintain the outer peripheral rubbing faces thereof in a spaced apart relationship characterized in that the radially inner peripheral edge of each side rail is connected by bridging members extending intermittently over at least a part of the inner circumferential length. The side rails and bridge members may be formed from a substantially flat bottomed "U-shaped" channel section.

11 Claims, 2 Drawing Sheets

U.S. Patent
Nov. 12, 1991
Sheet 1 of 2
5,064,206
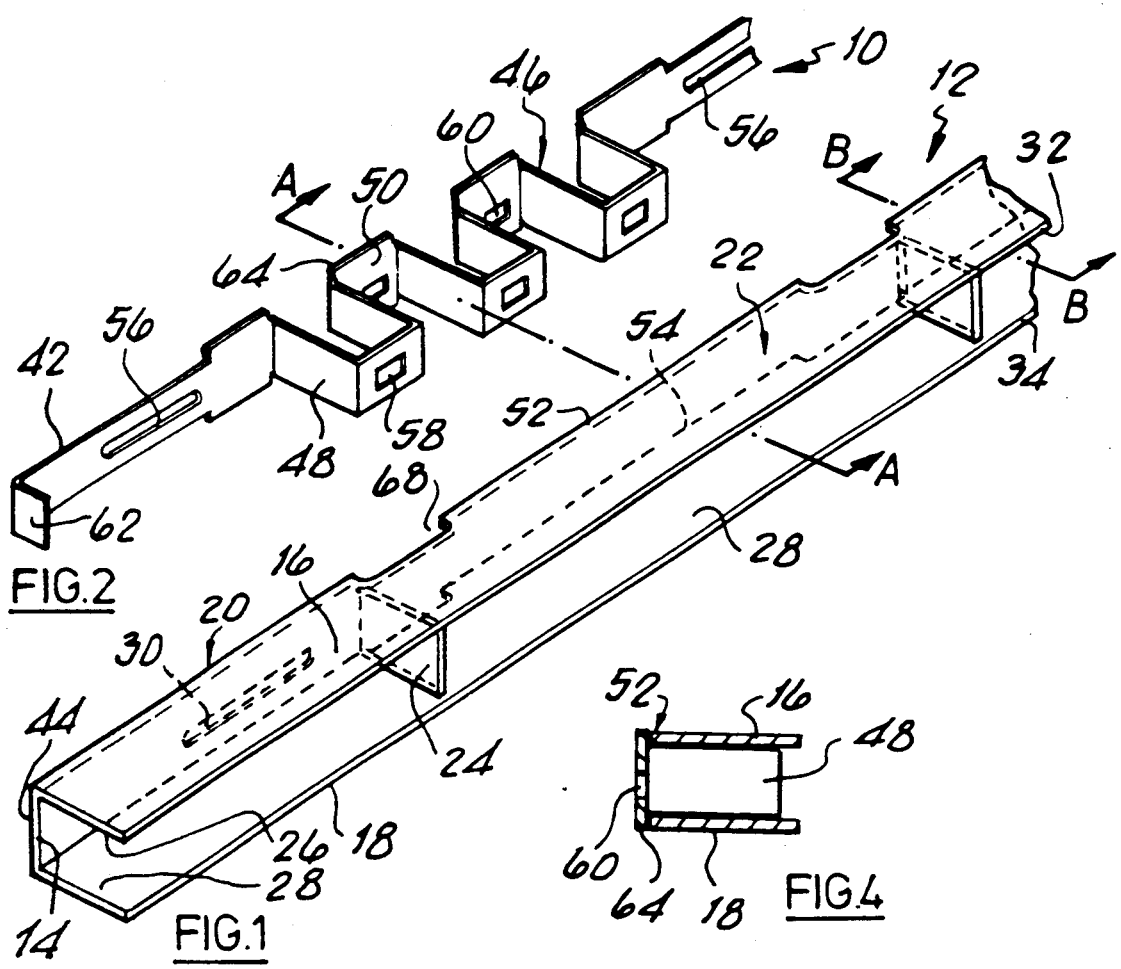
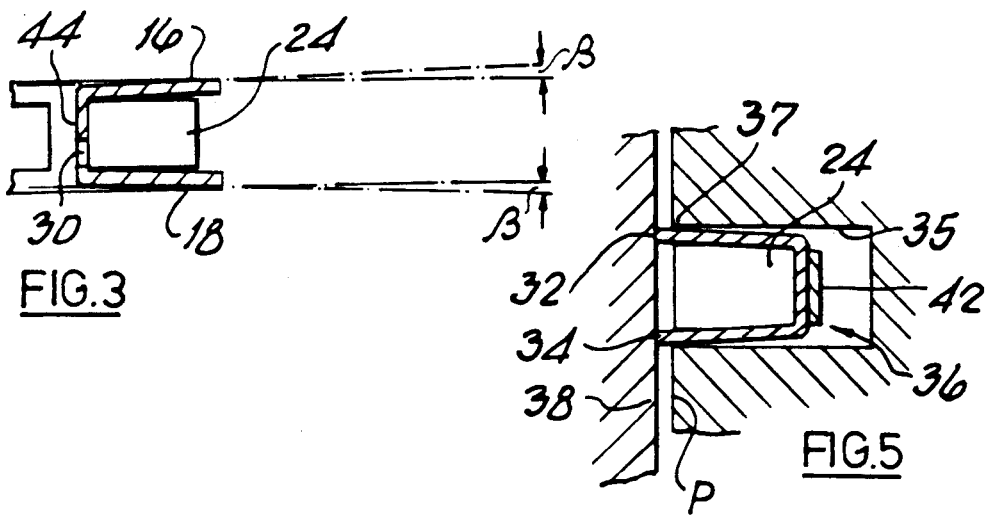

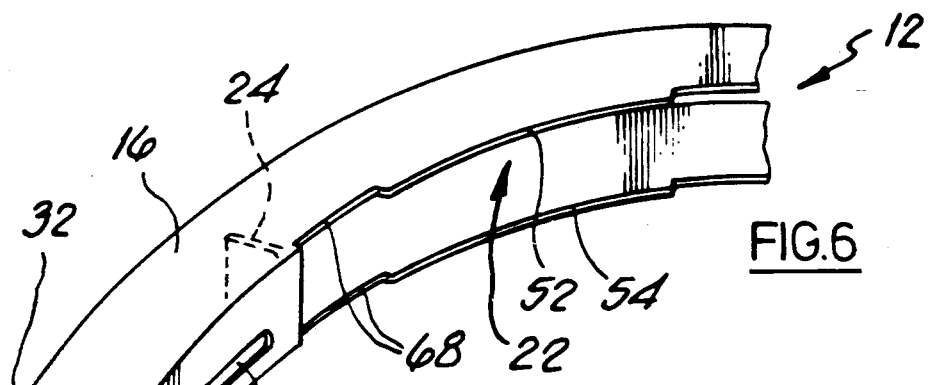
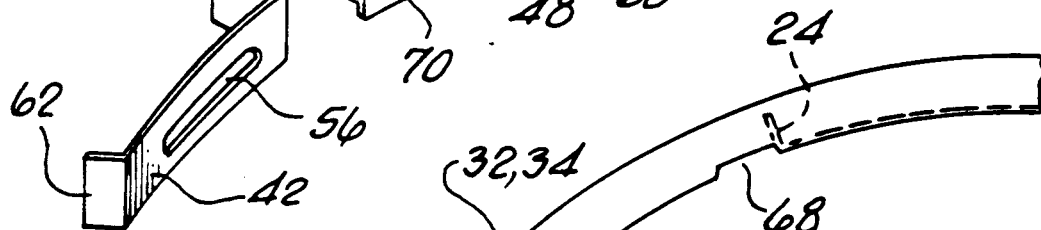
FIG.6
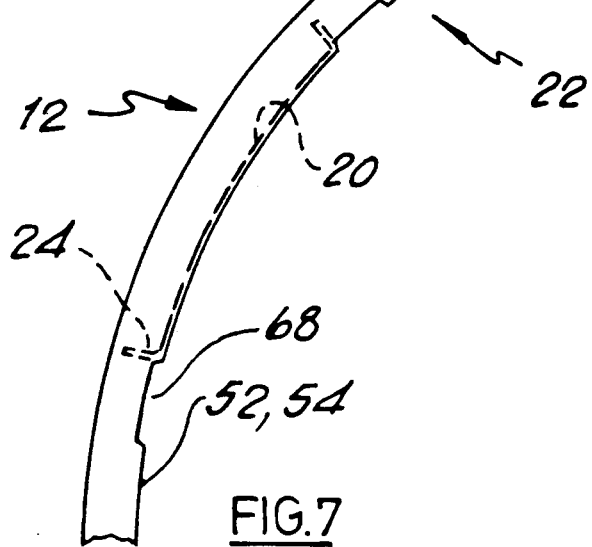
FIG.7

PISTON RING

The present invention relates to a piston ring and particularly to an oil-control ring for an internal combustion engine or compressor which comprises pistons reciprocating in an associated cylinder.

Oil-control or oil scraper rings, as they are otherwise known, are used on pistons in engines to prevent or limit the passage of oil into the combustion chamber and so prevent excessive oil consumption.

Multi-piece oil-control rings comprising two separate side rails which are held apart and urged against a cylinder wall by an expander spring are well known. A problem with this type of ring is that at high engine speeds the side rails may become unstable and vibrate resulting in high oil consumption.

Another type of oil ring commonly used in an iron ring having a helicoidal expander spring contained in an annular groove in the rear face of the ring. This type of ring is expensive to produce and is difficult to make with an axial height of less than about 3mm.

It is an object of the present invention to provide an oil ring which overcomes the above disadvantages and may be produced with an axial height of about 2mm or less.

According to the present invention there is provided an oil-control piston ring comprising a pair of axially spaced apart side rails, the side rails each having a radially outer periphery forming a rubbing face with a co-operating cylinder wall, an expander having portions which lie between the inner, radially extending faces of the side rails and maintains the outer peripheral rubbing faces thereof in a spaced apart relationship characterised in that the radially inner peripheral edge of each side rail is connected by bridging members extending intermittently over at least a part of the inner circumferential length.

Preferably, the side rails and bridging members forming the body of the ring may be formed from a single strip bent longitudinally into a "U shaped" channel section and, having portions of the bottom of the "U" removed to allow co-operating portions of the expander to lie between the side faces of the "U".

Portions, in the form of tongues, formed from the bottom of the "U" section maybe bent between the side faces of the "U" to act as distance pieces to maintain the side faces in a spaced-apart relationship.

Both the side rails and the expander spring may be made of steel.

The side rails may not be parallel but may be divergent in the range of from 0° to 20°. If they diverge, the side rails may bear against the radial side faces of the co-operating piston ring groove in the piston and enhance control of the passage of both oil and gas past the piston ring. Furthermore, the effect of the side rails rubbing against the corners of the co-operating piston ring groove is to maintain the ring outer periphery in constant contact with the cylinder wall.

Both the bridge members between the side/rails and the co-operating parts of the expander may be slotted, or otherwise perforated, to allow oil to drain away through the appropriated holes or slots in the co-operating piston ring groove in the piston. Similarly, the portions of the expander lying between the side rails may have appropriate slots or apertures to assist oil drainage.

The body of the piston ring comprising the two side rails may be formed by NC techniques or other appropriate methods. The body of the piston ring may be formed to a desired non-circular profile.

The rubbing faces of the piston ring body maybe treated by known techniques to improve, for example, the wear characteristics thereof. Such treatments may include nitro carburising or chromium plating, for example.

Similarly, the sliding surface of the cylinder wall or liner maybe provided with a compatible coating.

In order that the present invention maybe more fully understood an example will now be described by way of illustration only with reference to the accompanying drawings, of which:

FIG. 1 shows a perspective view in a rectilinear development of a portion of the piston ring body;

FIG. 2 shows a similar perspective view of a portion of the expander spring;

FIG. 3 shows a cross section on the line BB of FIG. 1;

FIG. 4 shows a cross section on the line AA of FIGS. 1 and 2 with the expander inserted into the piston ring body;

FIG. 5 shows a section of the piston ring in a co-operating piston ring groove co-operating with a cylinder wall;

FIG. 6 is an exploded perspective view of a portion of the piston ring body and expander ring; and FIG. 7 which shows a plan view of a quadrant of the piston ring body.

Referring now to the drawings and where the same features are denoted by common reference numerals.

A portion of the expander spring is shown at 10 and a portion of the ring body is shown at 12. The body 12 comprises a generally "U shaped", flat-bottomed channel section having a base 14, an upper side rail 16, a lower side rail 18 and bridge memebers 20 which are portions of the base 14, joining the inner radial peripheries of the side rails. Intermittent portions of the base 14 of the "U" shaped channel are removed to leave apertures 22 which receive spring portions of the expander 10 as described below. Tongues 24 formed from the base 14 of the "U" channel are bent inwardly to lie between the inner faces 26, 28 of the side rails 16, 18 and maintain the side rails in a spaced-apart relationship. Slots 30 are formed in the bridge members 20 for oil drainage purposes. The outer peripheries 32, 34 of the side rails 16, 18 form rubbing surfaces with an associated cylinder wall 38. The side rails 16, 18 may be parallel or may lie at an angle $\beta$ of between 0° and 20° to bear against the radial side faces 35 of the co-operating piston ring groove 36 of the piston 'P'. The corners 37 of the groove 36, because of the divergence of the side rails, help to urge the peripheries 32,34 against the cylinder wall 38 to enhance control of oil consumption and blow by of combustion gases into the engine crankcase. The expander spring 10 comprises curved portions 42 which press against the inner faces 44 of the bridge members 20, and spring portions 46 of generally castellated shape in plan view. The expander spring 10 comprises portions 48 which lie between the side rails 16, 18 of the body and act as spacers and base portions 50 which, at the edges 64 and 70, lie against the inner peripheries 52, 54 of the side rails in the region of the apertures 22 compressed between successive bridging members 20. When the piston ring 12 is compressed in the piston ring groove 36 for insertion into the engine cylinder, the expander 10, compressed by the piston ring body 12, exerts a pressure in the radial direction to urge the body 12 in an outwardly direction against the cylinder wall 38. In operation mutual sliding occurs between the axially extended edges 64,70 of the base portions 50 and the edges 52,54. Slots 56 are formed in the portions 42, and which co-operate with the slots 30 for oil drainage. Oil drainage slots 58, 60 are also provided in the portions 48 and base portions 50. Outwardly directed tabs 62 are formed at the expander circumferential ends and which abutt and lie inside one of the apertures 22, generally opposite the ends of the piston ring body 12.

I claim:

1. A 2-piece oil-control piston ring, the ring comprising a first piece having a pair of axially spacedapart side rails, the side rails each having a radially outer periphery for forming a substantially continuous uninterrupted rubbing face with a cooperating cylinder wall and having a radially inner periphery, said inner peripheries being connected together by axially directed bridging members extending intermittently around at least a part of the inner circumferential length of said rails, a separate second piece in the form of an expander lying against the radially inner faces of the axially directed bridging members for expanding said side rails radially outwardly against a cooperating cylinder wall and having spring portions which lie between the inner, radially extending faces of the side rails, wherein the side rails diverge from said bridging members by up to 20° such that the axially outer faces of said rails will bear against and form a gas seal with portions of radial side faces of a cooperating piston ring groove in which said 2-piece ring is mounted.

2. A ring as claimed in claim 1, wherein the side rails and bridging members are formed from a generally "U-shaped" channel section.

3. A ring as claimed in claim 2 wherein the portions of the expander lying between the side rails pass through apertures formed by removing parts of the base of the "U" channel.

4. A ring as claimed in claim 1 wherein there are fixed tongues extending between the side rails to maintain them in a spaced-apart relationship.

5. A ring as claimed in claim 4 wherein the tongues are formed by bending pieces of the base of the "U" channel between the side rails.

6. A ring as claimed in claim 1 wherein the bridge members further include apertures for oil drainage.

7. A ring as claimed in claim 1 wherein the expander further includes apertures for oil drainage.

8. A ring as claimed in claim 1 wherein the spring portions of the expander lying between the side rails are of castellated form in plan view.

9. A piston ring according to claim 8 wherein the radially inner, circumferentially directed parts of the castellated spring portions of the expander have axially extended edges which bear against the inner circumferentially extending edges of the side rails to urge the rubbing faces against a co-operting cylinder wall.

10. In combination, a piston having a piston ring groove and a 2-piece oil-control piston ring mounted in said groove, the ring comprising a first piece having a pair of axially spaced-apart side rails, the side rails each having a radially outer periphery for forming a substantially continuous uninterrupted rubbing face with a cooperating cylinder wall and having a radially inner periphery, said inner peripheries being connected together by axially directed bridging members extending intermittently around at least a part of the inner circumferential length of said rails, a second piece in the form of an expander lying against the radially inner faces of the axially directed bridging members for expanding said side rails radially outwardly against a cooperating cylinder wall and having spring portions which lie between the inner, radially extending faces of the side rails, said side rails diverging from said bridging memebers by up to 20° such that the axially outer faces of said rails bear against and form a gas seal with portions of radial side faces of said piston ring groove.

11. Apparatus as claimed in claim 10 wherein the axially outer faces of said rails bear against and form a gas seal with radially outer corners of said piston ring groove.

* * * * *